UNITED STATES PATENT OFFICE.

GUSTAVUS A. GESSNER, OF FREMONT, OHIO.

IMPROVEMENT IN PROCESSES OF PRODUCING MALT EXTRACT.

Specification forming part of Letters Patent No. 220,825, dated October 21, 1879; application filed August 25, 1879.

*To all whom it may concern:*

Be it known that I, GUSTAVUS A. GESSNER, of Fremont, in the county of Sandusky, and in the State of Ohio, have invented certain new and useful Improvements in the Process for Producing Malt Extract; and I do hereby declare that the following is a full, clear, and exact description thereof.

The design of my invention is to enable fluid malt extract for medicinal purposes to be produced without decomposition through fermentation of the diastase, to which end it consists in the process of producing malt extract by causing a heated extractive fluid to percolate through the grain while keeping said grain correspondingly heated, all as hereinafter more fully set forth.

To carry the invention into effect I employ a vat for containing grain, which has a perforated bottom, and is provided exteriorly with a jacket, and, if desired, interiorly with pipes through which steam, hot water, or other heat-transmitting medium may be passed, so as to enable the contents of said vat to be maintained at a temperature of from 156° to 160° Fahrenheit. I now cause water or other extractive liquid heated to a temperature of 160° Fahrenheit, or less, to percolate through the grain, which has previously been cracked, during which operation the malt extract is produced and passes with said extractive liquid through the perforated bottom of the vat.

Between the temperature of 156° to 160° the diastase is most active in converting the starch of the malt into dextrine and sugar, and the maximum percentage of yield of said products is thereby secured, while if the temperature is raised above 160° the diastase has less solvent power, and any material increase of heat will destroy it. As the temperature falls below 156° the diastase loses in solvent power, less starch is converted and dextrine and sugar produced, and fermentation is favored either while the malt extract is being produced or after it has been bottled.

Malt extract produced between the degrees of temperature named possesses greatly superior medicinal qualities, and will keep without fermentation or chemical change for any length of time and in all climates, while at a higher or lower temperature during production the value of the extract is lessened and its fixedness rendered uncertain or destroyed.

In consequence of these facts it is desirable that the extractive liquid should maintain its temperature until it leaves the vat, which result can only be secured by heating the grain, as before described, so that it may not absorb heat from said extractive liquid.

Considerably more time is required for producing malt extract by percolation than by means of a brewer's mash-tub, in consequence of which fermentation of the contents of the vat would take place were it not for the application of heat to the grain, so as to maintain its temperature above the point at which fermentation is possible.

The extract produced by my process is employed, medicinally, by being administered plain or combined with alteratives, hypophosphites, &c.

Having thus fully set forth the nature and merits of my invention, what I claim as new is—

The process of producing malt extract, avoiding danger of fermentation during the operation, which consists in causing a heated extractive liquid to percolate through the grain while keeping said grain heated to a temperature of from 156° to 160° Fahrenheit, substantially as specified.

In testimony that I claim the foregoing I have hereunto set my hand this 17th day of July, 1879.

GUSTAVUS A. GESSNER.

Witnesses:
R. H. RICE,
C. F. RICE.